United States Patent [19]

Ahn et al.

[11] Patent Number: 4,870,507

[45] Date of Patent: Sep. 26, 1989

[54] VIDEO TAPE RECORDER SYSTEM

[75] Inventors: Jung-ku Ahn, Anyang; Jong-ahn Kim, Seoul; Jong-Kwan Paik; Hee-Chul Gong, both of Suweon, all of Rep. of Korea

[73] Assignee: Samsung Electronics Co., Ltd., Suweon, Rep. of Korea

[21] Appl. No.: 94,381

[22] Filed: Sep. 4, 1987

[30] Foreign Application Priority Data

Sep. 6, 1986 [KR] Rep. of Korea .................. 1986-7478

[51] Int. Cl.$^4$ .............................................. H04N 9/79
[52] U.S. Cl. .................................... 358/316; 358/328; 358/330; 358/310; 360/84
[58] Field of Search ............... 358/310, 323, 335, 341, 358/328, 330; 360/27, 84, 33.1, 130.24

[56] References Cited

U.S. PATENT DOCUMENTS 4,390,906  6/1983  Furumoto et al. .................. 360/19.1
4,402,023  8/1983  Hiraguri ................................ 360/77

Primary Examiner—James B. Mullins
Attorney, Agent, or Firm—Robert E. Bushnell

[57] ABSTRACT

A tape format of 4-mm wide video tape for use in a video tape recorder adopting helical scanning and azimuth recording methods is disclosed in conjunction with a video tape recorder system thereof, which enables the video tape recorder to achieve the greatest size-reduction and improve the resolution in picture reproducing by raising the S/N ratio of video signals. The tape format includes a video width area for an automatic track finding signal to control the traveling of tape and the video signal consisting of color signals and luminance signals, an option track area for recording audio signals, a first guide area for keeping the minimum part of tape in touch with the upper drum, a second guide area for separating the audio signals of the option track area from the video signals of the video width area, and first and second overlap areas respectively below the first guide area and above the second guide area, provided for overlapping the video signals on the edges of video tracks in recording operation.

31 Claims, 10 Drawing Sheets

FIG.10(a') 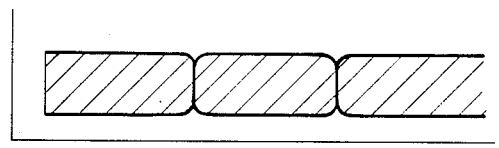
FIG.10(b') 
FIG.10(c') 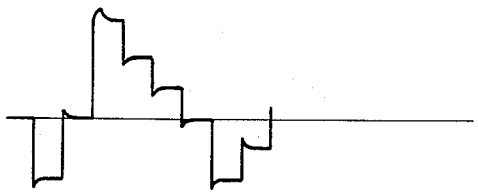
FIG.10(d') 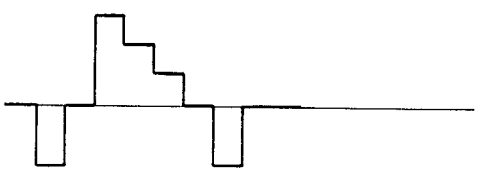
FIG.10(e') 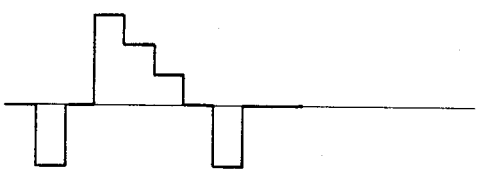
FIG.10(f') 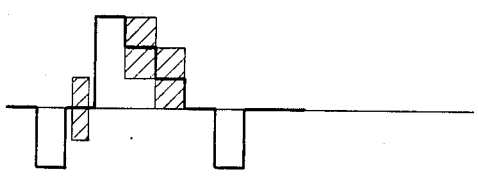
FIG.10(g') 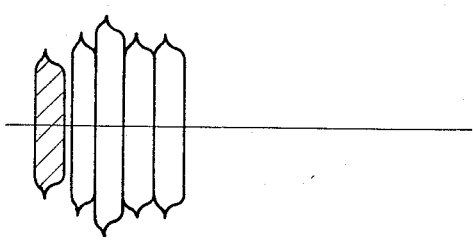
FIG.10(h') 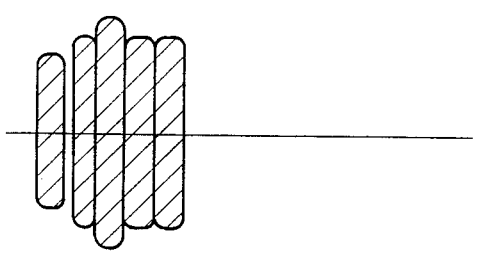

VIDEO TAPE RECORDER SYSTEM

BACKGROUND OF THE INVENTION

1. Field of the Invention

This invention relates to a video tape recorder system, and more particularly to a video tape recorder system which employs a video tape having the width of 4 mm as media for recording video and audio signals.

2. General Description of the Prior Art

Recently, an increasing demand for reducing the physical size of a video tape recorder(VTR) has existed. In conjunction with the achievement of this demand, it will become very critical to employ a narrower video tape as the recording media for use in the VTR, due to which the VTR system can be designed and made to a considerably small phyical size. Considering this, there has been developed a VTR system which employs a video tape having the width of 8 mm. However, the VTR system using the 8-mm tape is not yet small in size enough to provide its user with a full satisfaction for the portable use. Accordingly, a further demand for a more size-reducible VTR system which employs a narrower tape than the 8-mm tape has remained unsolved.

As a prior art, FIG. 1a and 1b respectively show a tape format and a frequency distribution diagram in a ½-inch video tape for use in a conventional VTR system. This VTR system of the prior art adopts as its scanning method a helical scanning in which the head drum has two video heads at an interval of 180° in degrees and one field of video signals is recorded into one line of video track pitch at a slant angle to the traveling direction of the tape. As its recording method it uses a azimuth method in which the head gap between its writing(recording) head and its reading(reproducing) head is operated with a tilt of a certain angle.

Referring to FIG. 1a showing the tape format of the prior art which uses the ½-inch(12.65 mm) video tape, an audio tape width C for writing the audio signals is located in a 1-mm wide strip from the utmost top of the tape, an audio-to-video guide width F for precisely dividing the audio signals and video signals is set into a 0.15-mm wide strip below the audio track width C, and an upper overlap area H1 is located below the audio-to-video guide width F with a 0.265-mm width. In a 0.75-mm wide strip from the bottom of the tape is located a control track width D for writing control signals to control the transport of the tape. A control video guide width G for dividing the control signals and the video signals into two areas is set into a 0.15-mm wide strip to the upper part of the control track width D and a lower overlap area H2 is located to the upper part of the control video guide width G with a 0.265-mm width. A video full width B including the upper and lower overlap-areas H1 /and H2 has a 10.60-mm wide area of tape. This format enables to record video signals of enough frquency bands on the tape. Referring to FIG. 1b showing the frequency bands distribution in the video full width B of the ½-inch video tape, provided that the maximum frequency range roughly reaches to 7 MHz, the component COL of color signals becomes 629 KHz, and the carrier frequency-modulated(FM) signals from the luminance signals amounts to 3.4 MHz-4.4 MHz. Thus its frequency deviation has come to use 1 MHz.

As stated above, the ½-inch tape format of VHS type has not any difficulty in recording the audio signal, the video signal and the control signal together on the tape, but because of its very large width being 12.65 mm wide, the diameter of the drum for the VTR system becomes large, for example, to be 62 mm wide, which consequently results in a large size of the hardware mechanism for operating the system. Furthermore, because the control signal to control the transport speed of the tape is independently recorded into the control track width, a control head to read the control signal must be independently installed, which also has caused a problem in size reducing and cost saving. As a result, the VTR system having the 12.65 mm wide video tape is not adequate for portable use.

As another prior art, FIG. 2a and 2b respectively show a tape format and a frequency distribution diagram in a 8-mm wide video tape for use in another VTR system, by which the physical size of a VTR system is considerably reduced to be more adequate for portable use. Referring to FIG. 2a, a first option track C' is located in the upper part of the 8-mm tape width A', a first guide width F' is located below the first option track C' for dividing other signal area next to the first guide width F' and a first overlap area H1' is located below the first guide width F'. In the bottom part of the tape width A' is located a second option track D', a second guide width G' is located above the second option track D' to divide the second option track and other area, and a second overlap area H2' is located above the second guide width G'. The area between the first guide width F' and the second guide width G' including both the first and second overlap areas H1' and H2' amounts to the video full width B', which records the video signal, the audio signal and the control signal altogether. Referring FIG. 2b showing the frequency band distribution in the video full width B' of the 8-mm video tape, automatic track finding(ATF) pilot signals which are used to control the traveling of the tape are set into the lower frequency band area f1=102.5 KHz, f2=118.9 KHz, f3=165.2 KHz and f4=148.6 KHz, provided that the maximum frequency range roughly reaches to 7 MHz. Also, its audio component AUD is set into the frequency 1.5 MHz and the carrier frequency of luminance signals is set into 4.2 MHz to 5.4 MHz by which its frequency deviation has come to use 1.2 MHz.

In the 8-mm video tape as mentioned above, the diameter of its drum to read out the video signal, the audio signal and the control signal from the tape is reduced to 40 mm, a considerably small size, compared with that for the 12.65-mm tape. However, this 8-mm VTR system has not yet achieved the completely satisfactory size reduction of the VTR apparatus for the portable purpose due to its comparatively large hardware mechanism. This has raised an increasing demand for the compact-sized VTR system intended for portable use with more diverse functions serviced.

OBJECTS OF THE INVENTION

Accordingly, an object of the invention is to provide an improved tape format. Yet another object is to provide a tape format of a 4-mm wide video tape for use in recording and reproducing video signals, audio signals and control signals to control both the video signals and the traveling of the video tape, in which the area for the video signal is set into the largest size so as to be able to improve the resolution(visibility) of the video outputs by raising the signal-to-noise(S/N) ratio of the video signal to the highest level, in a VTR system.

Another object of the invention is to provide a tape format for use in a 4-mm wide video tape for recording in a video signal area an ATF signal to control the travel of the tape, a luminance signal and a color signal, and also in an option track area an audio signal.

A still another object of the invention is to provide and to establish compatibility among VTR's and unify their specifications by providing a standard frequency distribution diagram in recording and reproducing a video signal, an audio signal and an ATF signal.

SUMMARY OF THE INVENTION

To achieve these and other objects of the invention, there is provide a tape format of a 4-mm wide video tape using the helical scanning and azimuth recording method, comprising:

A tape format of 4-mm wide video tape for use in a VTR system adopting helical scanning and azimuth recording methods, said tape format comprising:

- a first guide area adapted in the most upper part in said tape to get the minimum portion of said tape to be in touch with an upper drum of said VTR system for preventing pictorial image outputs from swinging, audio outputs from trembling and a video head from wearing out which result from the movement of said video head protruding from of the outer surface of said drum in conjunction with the revolution of said drum;
- an option track area adapted in the lower most part in said tape so as to the minimum portion of said tape for preventing said pictorial image outputs from swinging due to the trembling motion of said tape in the revolution of said drum and enabling audio signals to be recorded on said tape, taking into account the minimum gap of a tape lead line in said drum and the minimum gap between the upper half and the lower half in said drum;
- a second guide area adapted in a next part of said option track area in said tape so as to have a minimum portion of said tape for separating said audio signals in said option track area from video signals in an adjacent other track;
- a first overlap area adapted next to said first guide area in said tape for providing a tape spacing which enables said video signals in the upper end portion of each field on a video track to be recorded in overlapping;
- a second overlap area adapted next to said second guide area in said tape for providing a tape spacing which enables said video signals in the lower end portion of each field on said video track to be recorded in overlapping; and
- a video width adapted to be taken between said first overlap area and second overlap area for recording automatic track finding signals, luminance signals and color signals in the maximum frequency band.

BRIEF DESCRIPTION OF THE DRAWINGS

Further objects and advantages of the invention will become apparent from reading the following description in conjunction with the accompanying drawings in which:

FIG. 10(a') to 10(g') are waveform diagrams illustrating aspects of operation in the block diagram shown in FIG. 9.

Throughout the drawings, like reference symbols are used to designate like or equivalent parts or portions, for simplicity of illustration and explanation.

DETAILED DESCRIPTION OF THE INVENTION

Figure 1A:
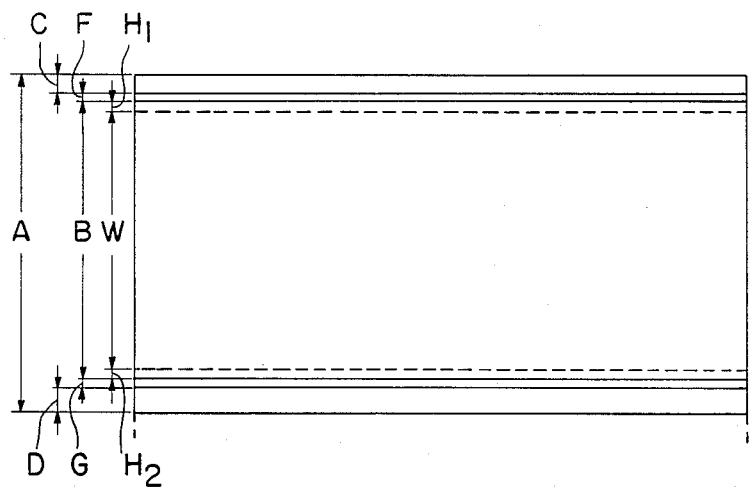
FIG. 1a and 1b respectively show a tape format and a frequency distribution diagram for a conventional 12.65-mm video tape.
Figure 1B:
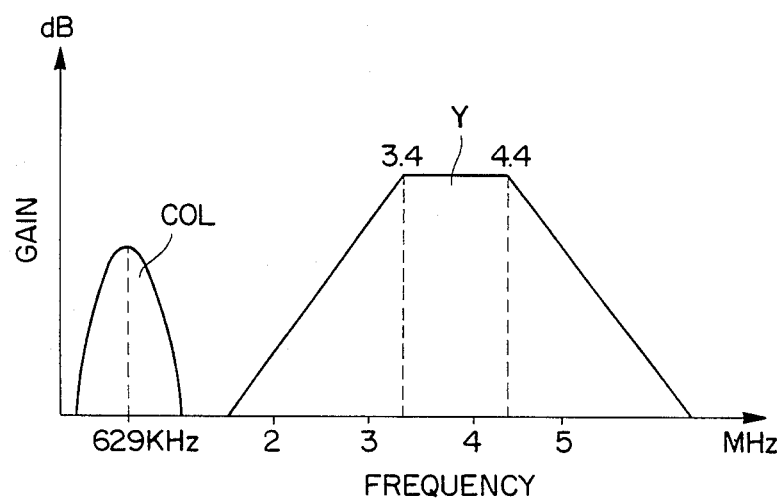
Figure 2A:
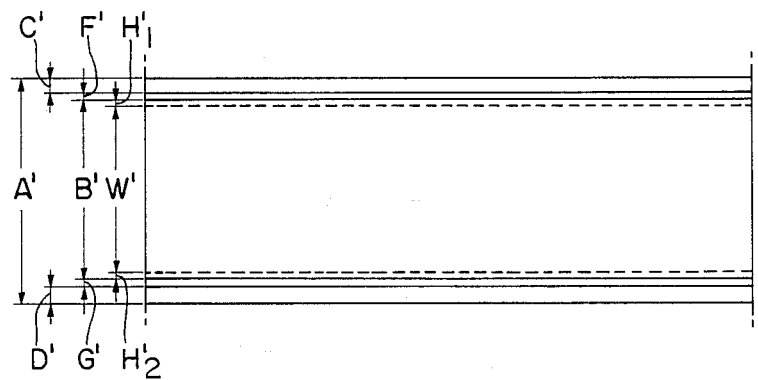
FIG. 2a and 2b respectively show a tape format and a frequency distribution diagram for a conventional 8-mm video tape.
Figure 2B:
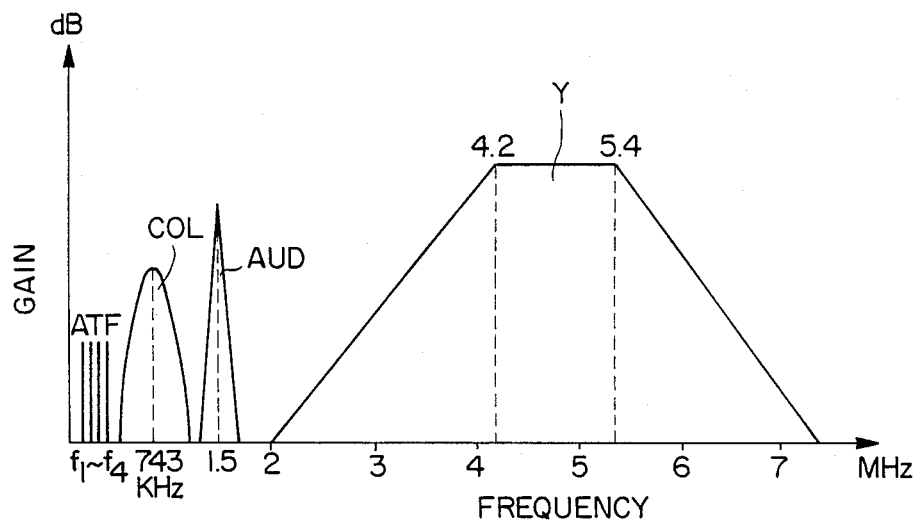
Figure 3A:
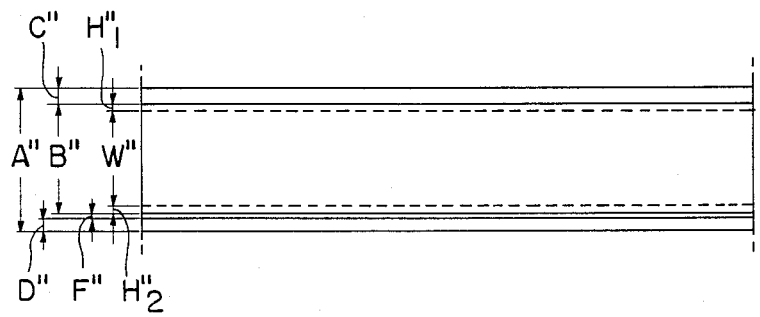
FIG. 3a and 3b respectively show a tape format and a frequency distribution diagram for a 4-mm video tape according to the invention.

Referring to FIG. 3a illustrating a format structure of 4-mm video tape for use in a VTR system according to the invention, a spacing A" in the tape repreesents a full width of a digital audio tape(DAT) used in the invention, having the width of 3.81 mm. A spacing B" represents a video full width of the tape, having the width of 2.9 mm, the maximum width that can be recorded by taking into account the overlapping of the video signals. A spacing C" represents a first guide area having the width of 0.3 mm which is the minimum tape width adapted to be in touch with a upper drum in the revolution of drum employing the helical scan method. A spacing D" is for an option track area, having the width of 0.5 mm which is set up into the narrowest width for excluding the swings of the video and audio outputs resulting from the irregular trembling of the tape during its traveling, as well as for recording audio signals. A spacing F" represents a second guide area, having the width of 0.1 mm for considering the minimum gap of the drum lead line and the minimum gap between the lower drum and the upper drum, and seperating the audio signals and the video signals from the tolerance in assemblying the mechanism of the VTR system. Spacings H1" and H2" respectively represent a first overlap area and a second overlap area, each having a width of 0.095 mm for preventing the signals from missing in the connecting part between a first field and a second field in the video track by having the video signals in both end part of each field overlapped in recording.

Figure 3B:
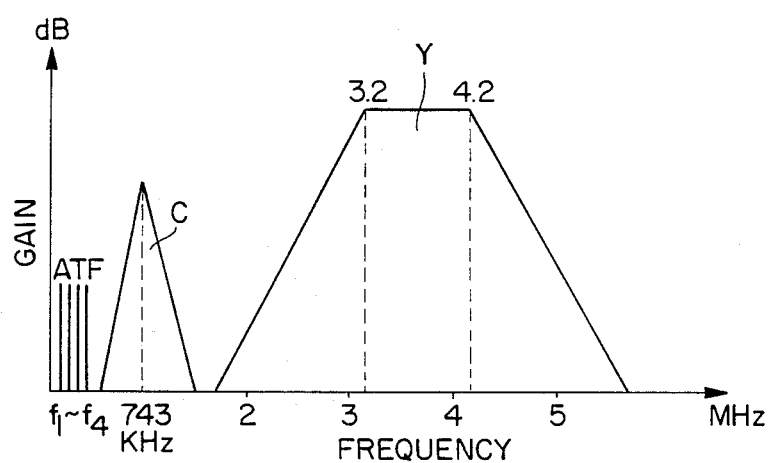

FIG. 3b is a diagram illustrating a frequency distribution of the video tape for use in a 4-mm type VTR according to the invention, in which is shown each frequency band component recorded in the video full width of the tape. Referring to the diagram, ATF pilot signals f1 to f4 are recorded in the frequency bands of f1=102.5 KHz, f2=118.9 KHz, f3=165.2 KHz and f4=148.6 KHz, the color frequency component COL is given in the frequency band of 743 KHz and the carrier frequency of the luminance(Y) FM signal is given in the frequency band of 3.2 MHz–4.2 MHz, which gives the frequency deviation of 1 MHz. ATF signal-to-color signal ratio is maintained in the level of $-10\pm 1$ dB to stabilize the ATF signal and the FM frequency of the luminance signal is made lower compared with that of the 8-mm VTR, to raise the analog signal ratio in the analog signal-to-noise ratio because the high frequency band area includes more noise than the low frequency band area.

Figure 4A:
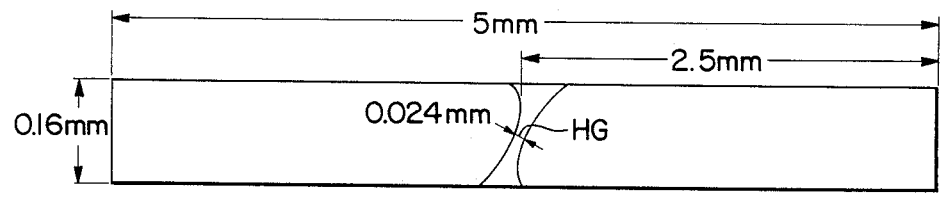
FIG. 4a shows a schematic plan view of a video head surface.
Figure 4B:
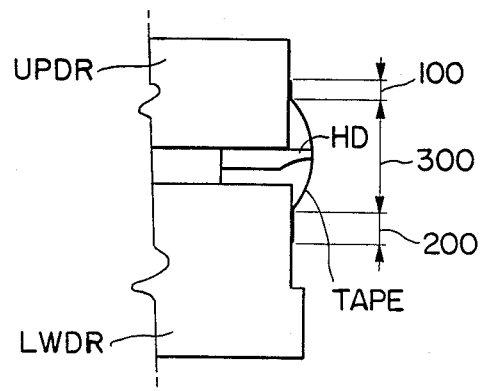
FIG. 4b is a situational diagram showing the status of the tape touching a head drum in operation.
Figure 4C:
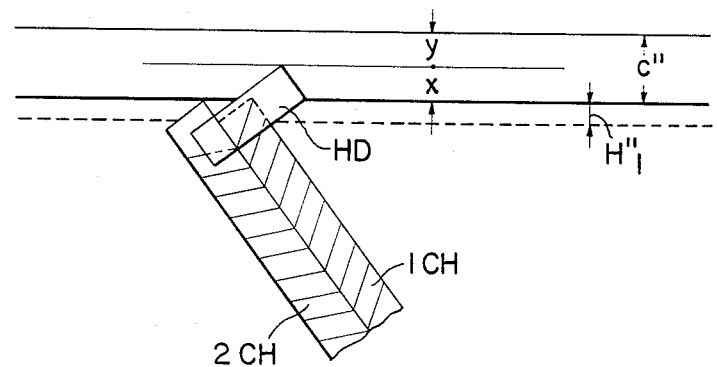
FIG. 4c shows a diagram of scanning of video signals by a video head.

FIG. 4a to 4c respectively show a schematically structural diagram of the video head, a schematically situational diagram of the video head drum with the tape being in a close contact with the drum in scanning operation of the video head and a schematically situational diagram of scanning the video signal recorded in the video full width by the video head during revolution of the drum.

Figure 5A:
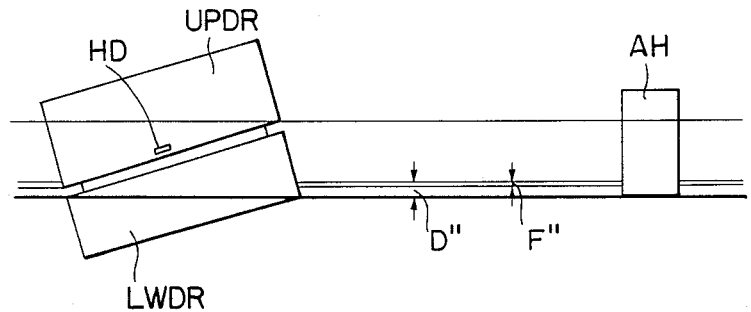
FIG. 5a and 5b respectively show schematic and situational diagrams of a drum and an audio head.
Figure 5B:
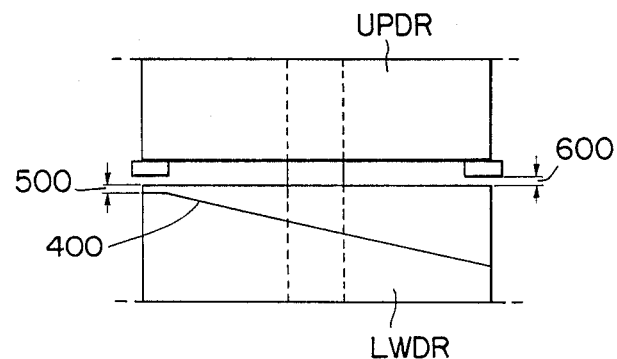

FIG. 5a and 5b respectively show a schematic diagram for the arrangement the drum and the audio head to read out the signal written in the video tape and a schematic diagram for the physical structure of the upper and lower drum.

Figure 6:
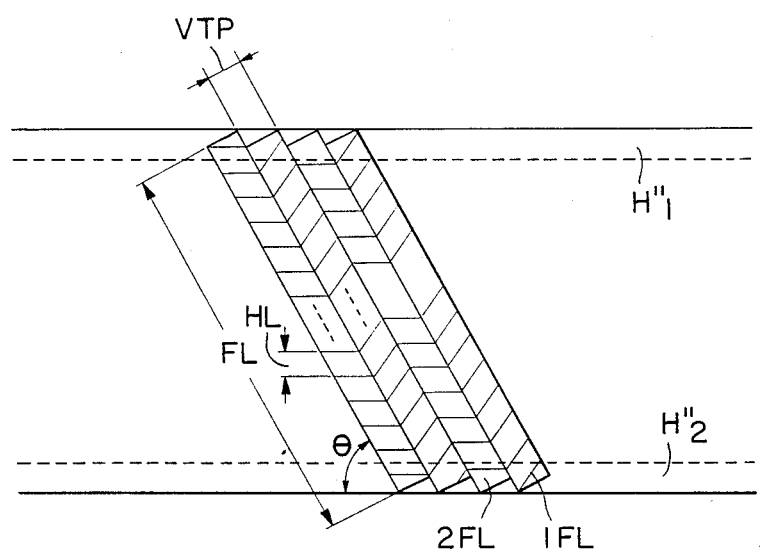
FIG. 6 is a schematic diagram illustrating the state of video signals being recorded in a video full width of a 4-mm video tape.

FIG. 6 is a schematic diagram illustrating the state of the video signals recorded in the video full width of the 4-mm video tape.

Referring now to the above mentioned drawings FIG. 3 to FIG. 6, the structural format of the 4-mm video tape according to the invention wil be described in detail. Prior to designing the formats for the 4-mm video tape, it always must be preceded by the designs for the drum and the video head. To reduce the size of the VTR system, the diameter of the drum is taken as 30 mm, the tape winding angle to the drum is taken 180° with a little margin given to the in- and out-paths of the tape, the gap between the upper drum and the lower drum is taken into 0.1 mm, the manufacturing tolerance of the end part of the lead line is taken into 0.2 mm, the head protruding from the drum surface is taken into 0.024 mm, the video head width is made 5 mm, and the head thickness is taken into 0.16 mm. Considering these mechanical designs, the format of the 4-mm video tape will be described hereinafter.

On the basis of the 30-mm diameter drum and the predetermined video head, a video width, which will be referred to as W" hereinafter, taken to record the video signal with the maximum level in designing the format of the 4-mm video tape is shown in the following formula.

$$W'' = (\pi D/2) \cdot \sin \theta \qquad \text{formula (1)}$$

here,
W"=the video width
$\pi$=the ratio of the circumference of a circle (Pi)
D=the diameter of drum; 30 mm
$\theta$=the angle of video track From the above formula (1), the video track angle $\theta$ is derived as the following, By the above formula (1), (2), taking the video track angle $\theta$ into 3°2$\theta$, for making the maximum video width to record the video signals into the 4-mm tape, the video width W" becomes 2.71 mm, which satisfies the video track angle from the formula (2).

To continuously read out the video signals recorded in the video width W" by the revolution of the video heads for the first channel 1CH and the second channel 2CH according to the drum revolution, a marginal tape area needs to be taken into account, so that the minimum part of the tape should be in contact with the upper drum. This area is to prevent the picture on the screen from trembling, the audio output from vibrating, and the head from wearing out by its protruding in the helical scanning. The video head HD as shown in FIG. 4a, having the head width of 5 mm, the head thickness of 0.16 mm and the head gap of 0.024 mm, is coupled between the upper drum UPDR and the lower drum LWDR as shown in FIG. 4b. If the upper part 100 of the video tape is not in contact with the upper drum UPDR in the helical scanning, the swing phenomena of signals being read out of the tape results, as is mentioned above. To remove such phenomena, there is required a certain guide area which makes the minimum part of tape be in touch with the upper drum UPDR during revolution of drum to provide maximum video area. The guide area is referred to as the first guide area C" which is also shown in FIG. 4c. When the video head HD of the first channel is in scanning state of overlapping the last horizontal signal H of the first field (1FL), provided that a partial area taken in the first guide area by the video head width and thickness is set into X, the following formula is taken.

$$X = \frac{\text{half width of head}}{2} \cdot \sin\theta + \frac{\text{thickness of head}}{2} \cdot \cos\theta \qquad \text{formula (3)}$$

Here, the width of head is 5 mm, the thickness of head is 0.16 mm, and the angle $\theta$ is 3°20".

As a result, the length X becomes 0.1533 mm. Also, when an area capable of reaching to the upper drum UPDR of the first guide area is taken to Y, the following formula is made.

$$Y = \frac{\text{head track pitch}}{\sin\theta'} \qquad \text{formula (4)}$$

Here, $\theta'$ is an angle between the drum and the tape in case that the tape surface is in touch with the drum due to the protruding of video head, which becomes 15°, and the head protruding length is 0.024 mm as described before. Accordingly, the length Y in the first guide area becomes 0.0927 mm, and the width C" of the first guide area amounts to about 0.3 mm.

In the meanwhile, the option track area D" which is the lowest part of the 4-mm tape, is the tape width for preventing the tape from swinging during its traveling and recording the audio signals. To maintain the constant traveling of tape without any swinging, the tape travels on the drum lead line 400. The minimum tolerance gap 500 in the fore part of the lead line 400 and also the minimum tolerance gap 500 in the fore part of the lead line 400 and also the minimum gap 600 between the upper drum UPDR and the lower drum LWDR is considered for the option track area D". On the manufacturing, the gap 500 of the fore part in the lead line is taken to 0.2 mm, the gap 600 between both the drums is taken to 0.21 mm, and thus the option track area D" is set into 0.41 mm to record the audio signals.

The second guide area F" is the tape width for completely dividing the audio signals recorded in the option track D" and any signals recorded in the video full width B", which is an area being determined by setting the tolerance in assembling the drum to the system body at 0.05 mm and the tolerance in assembling the audio head at 0.05 mm. That is, the second guide area F" and the option track area D" are made in the lower part of the tape for preventing the picture on the screen from swinging with the maximum efficiency and recording the audio signals, including the gaps 500 and 600 in the drum and the minimum tolerance to thoroughly separate the audio signals and the video signals.

Referring to FIG. 6, the video full width B, having the width of 2.9 mm, is an area except the first guide area C", the second guide area and the option track area D" in the 4-mm video tape, in which there are included the first overlap area H1", the second overlap area H2" and the video Width" being set up by the formula (1) and (2). In the video full width B", the length of a video track pitch(VTP) is set into the width of 0.024 mm by considering the design of the drum as mentioned above, and when each length of the first field 1FL and the second field 2FL is set to FL, the following formula is made.

$$FL = W''/\sin\theta = 48.547 \text{ mm} \qquad \text{formula (5)}$$

Here,

W" = the video width
$\theta$ = video track angle: 3°20'

At this time, a length HL of 1H (1 horizontal synchronization signal) in each field is taken by the above formula (5) as below, $$HL = FL/262.5 = 0.179 \text{ mm} \qquad \text{formula (6)}$$

Considering the length FL of the field and the field frequency fv to get a relative velocity between the transport speed of tape and the revolution speed of video head, the relative velocity Vh is set as follows.

$$Vh = fv \cdot Hl = 2.8 \text{ msec} \qquad \text{(formula 7)}$$

Getting the relative velocity Vh in another manner by using the design value of the drum mentioned before, the following formula is taken.

$$Vh = (\pi D/2) \cdot fv + Vt = 2.8 \text{ msec} \qquad \text{formula (8)}$$

Here, $\pi$ = the ratio of the circumference (pi)
D = the diameter of drum: 30 mm
fv = the field frequency: 59.94 Hz
Vt = the traveling speed of tape; ignored because very slow And then, because the head gap HG in the design value of the head as mentioned before is 0.024 mm and the wavelength $\lambda$ of the video signal corresponds to the double of the head gap, the following formula is taken.

$$\lambda = 2HG = 0.04 \text{ mm} \qquad \text{(formula 9)}$$

Here, because the maximum frequency fm recorded in the vdeo full width B" is taken from the relation fm = Vh$\lambda$, it is well understood that the maximum frequency range of the video signal to be recorded in the video full width B" by the formulas (7) to (9) reaches to 7 MHz. Accordingly, the maximum frequency of the video signal recorded in the video full width B" is 7 MHz, the video track angle is 3°20', the length of a field is 48.547 mm, the length of 1H is 0.79 mm, and the video track pitch(VTP) becomes 0.024 mm, by which it becomes possible the video signal to be recorded and reproduced with the maximum efficiency.

Figure 7:
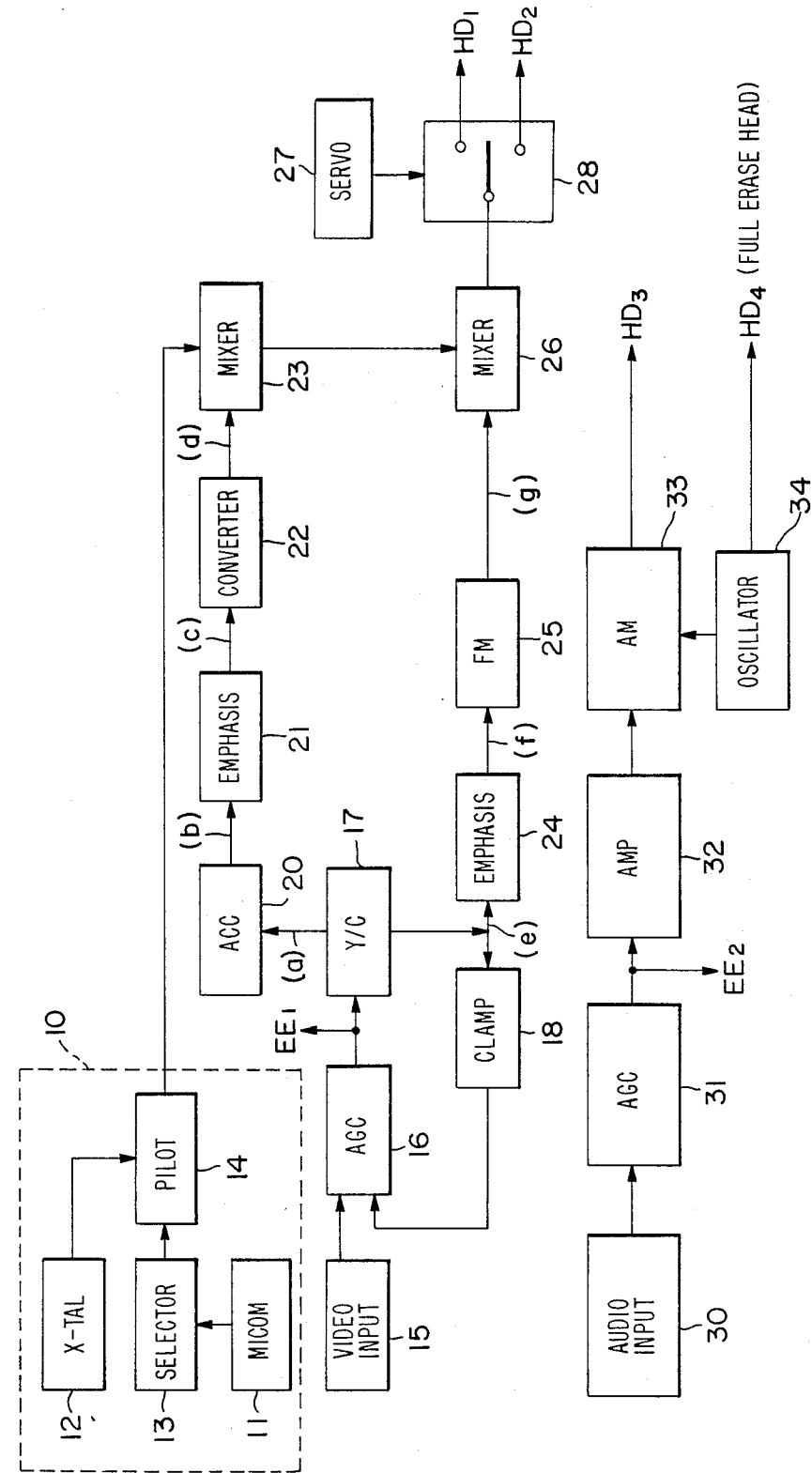
FIG. 7 shows a block diagram of the portion for recording the signals in a VTR system according to the invention.

FIG. 7 shows a block diagram for recording the signals on the 4-mm tape in accordance with the invention, in which there are included an ATF signal generator 10, a video input circuit 15 for receiving the video signals, a first automatic gain control(ACC) circuit 16 for maintaining the constant signal level, a luminance/color-(Y/C) separator 17 for separating the luminance signal and the color signal by means of delaying the input signal by one horizontal synchronization timing(1H), a clamp circuit 18 for clamping the output of the Y/C separator 17 at the constant potential, an automatic color control(ACC) circuit 20 for keeping constant the color signal level of 3.58 MHz, a first emphasis circuit 21 for raising the signal-to-noise ratio of the signal delivered from the ACC circuit 20 by emphasizing the higher band frequency component input and compensating it to deliver an output signal, a lower band converter 22 for converting the signal delivered by the first emphasis circuit 21 into 743 KHz to be recorded in the tape, a first mixer 23 for mixing an ATF signal supplied from the ATF signal generator 10 with the color signal from the lower band converter 22, a second emphasis circuit 24 for raising the signal-to-noise ratio of the luminance signal separated by the Y/C separator 17, a frequency modulation(FM) circuit 25 for modulating the luminance signals in order to be recorded in the tape, a second mixer 26 for mixing the output signal-(ATF+color) delivered from the first mixer 23 with the modulated luminance signal of the FM circuit 25, a servo circuit 27 for generating a specified continuous signal from the drum servo, a channel selector 28 for making the output signals of the second mixer 26 be recorded in the tape via video heads HD1 or HD2 and simultaneously being switched to each channel in the alternative mode in response to the continuous signal delivered from the servo circuit 27, an audio input circuit 30 for receiving audio signals, a second ACC circuit 31 for controlling the audio signals with a constant level, an amplifier 32 for amplifying the audio signals supplied by the second ACC circuit 31, an oscillator 34 for supplying oscillation signals needed to record the audio signals, and a modulator 33 for modulating the amplified audio signals in accordance with the output level of the oscillator 34 to be recorded in the tape via an audio head HD3.

Figure 8A:
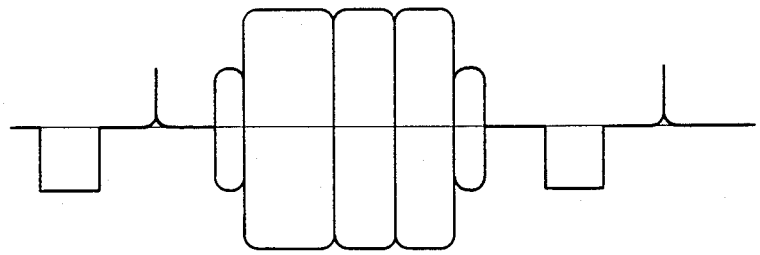
FIG. 8(a) to 8(g) are waveform diagrams illustrating aspects of operation in the block diagram shown in FIG. 7.
Figure 8B:
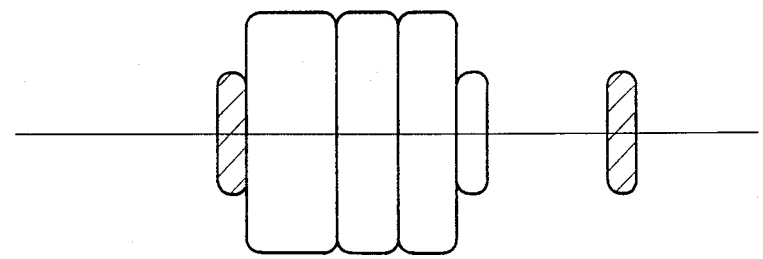
Figure 8C:
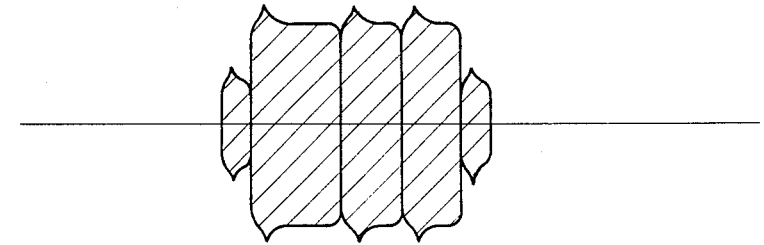
Figure 8D:
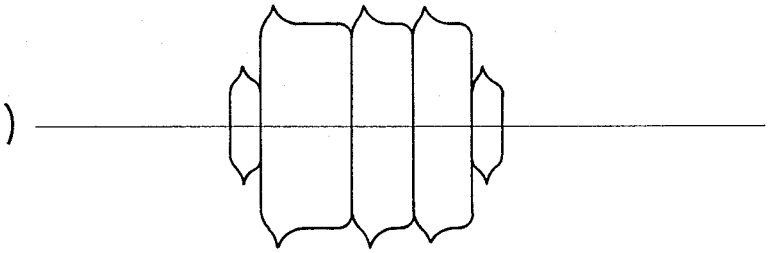
Figure 8E:
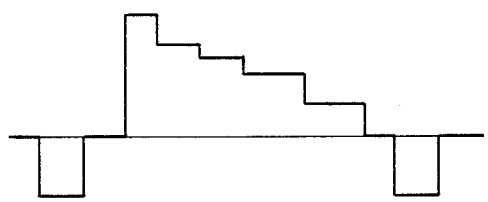

FIGS. 8(a) to 8(g) are waveform diagrams showing aspects of operation in FIG. 7 according to the invention, wherein:

FIG. 8(a) is a waveform of the color signal separated in the Y/C separator 17, FIG. 8(b) is an output waveform of the ACC circuit 20, FIG. 8(c) is an output waveform of the first emphasis circuit 21, FIG. 8(d) is an output waveform of the lower band converter 22, FIG. 8(e) is a waveform of the luminance signal separated in the Y/C separator 17

Figure 8F:
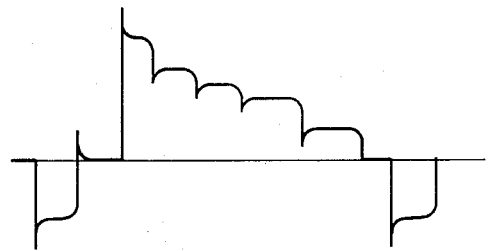

FIG. 8(f) is an output waveform of the second emphasis circuit 24, and

Figure 8G:
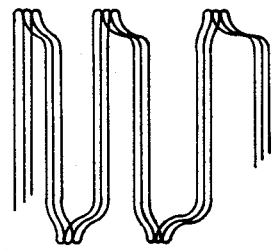

FIG. 8(g) is an output waveform of the FM circuit 25.

Now, a more detailed explanation will be made hereinafter for the recording operation i the VTR, with reference to the drawings, in particular to FIG. 7 and FIG. 8. An video signal having the luminance signal of zero to 4 MHz and the color signal of 3.58 MHz is entered to the video input circuit 15. To control the tape traveling speed at the constant rate in recording, an oscillation signal is generated from a crystal oscillator 12 in the ATF signal generator 10 and also four logic signals are generated from a logic selector 13 in accordance with output signals of a microcomputer 11. Applying these logic signals to a reference pilot generator 14, four pilot frequencies $f1=102.5$ KHz, $f2=118.9$ KHz, $f3=165.2$ KHz and $f4=148.6$ KHz are provided in accordance with the logic state by using the oscillation signal of the oscillator 12 and at the same time, are delivered to the first mixer 23. These signals are the control signal for recording and correspond to the frequency f1 to f4 as shown in FIG. 3b. The video signals-(Y+C) of the video input circuit 15 are maintained at the constant level through the first AGC circuit 16, in spite of the variation of the input video signals, and fed to the Y/C separator 17. Through an output terminal EE1, the current status of the pictorial image being received can be monitored. The video signal is delayed by 1H in the Y/C separator 17 and separated to make the luminance signal by adding two signals of before and after phases to each other and make the color signal by subtracting the two signals from each other, which make use of having the difference of 180° in the phase of the color signal per 1H. This color signal is shown in FIG. 8(a) and goes through a color band filter and the first ACC circuit 20 wherein the peak level of the input signals is sensed and compared and the gain is automatically controlled. FIG. 8(b) represents the output waveform of the first ACC circuit 20. Then, to raise the S/N ratio of the color signal, it is provided to the first emphasis circuit for emphasizing the sideband range of the color signal easy to be influenced by the noise. This output signal of the first emphasis circuit 21 is shown in FIG. 8(c). Noises which are apt to influence burst are eliminated by an increase of the burst level, and the color signal of 3.58 MHz with its S/N ratio raised is delivered to the lower band converter 22 to be converted to 743 KHz as shown in FIG. 8(d). For this process, there is needed a carrier frequency of 4.32 MHz, which is made from adding the 3.58 MHz frequency and the 743 KHz frequency. The 3.58 MHz frequency signal is made through the phase correction of signals being oscillated in the first ACC circuit 20 and the 743 KHz frequency signal is made by multiplying the horizontal synchronization signal frequency(fH) of 15.75 KHz by 378 and then dividing it by 8.

This color signal is entered into the first mixer 23, which corresponds to the color component COL as shown in FIG. 3b. The first mixer 23 mixes the output signals f1 to f4 of the ATF signal generator 10 with the 743 KHz output signal of the lower band converter 22. The output of the first mixer 23 is delivered to the second mixer 26 for another mixing. From the servo circuit 27, a 30-Hz frequency signal is provided to the channel selector 28 when the drum motor turns at 1800 RPM, alternately switches to the first channel CH1 or the second channel CH2, and via a first head HD1 or a second head HD2, the ATF+luminance+color signals are recorded on the tape as shown in FIG. 3b.

Because the audio area D" needs to be independently formated as mentioned before, the audio signal is entered into the audio input circuit 30 and then the second AGC circuit 31, in which its signal gain is maintained at a constant level and via the output terminal EE2, the current status of the input audio signal may be monitored by means of a speaker. This audio signal is amplified in the amplifier 32 and modulated into an AM signal in the modulator 33 in accordance with the oscillation output of the oscillator 34. Thus, through the audio head HD3, this AM-modulated audio signal is recorded in the audio area of the tape. A full erase head HD4 is used to erase out all the signals recorded in the tape by any prior recording.

A comb filter is used after the luminance signal has been generated. The luminance signal must not have the signal components, as each channel in the adjacent track becomes a offset state at every $[(2n+1)FH]$ divided by 2, but on the contrary, if any signal components are present, these make influences on other channels and some noises due to crosstalk. Therefore, to get rid of these components, the luminance signal is limited and amplified by using the comb filter, to provide the waveform shown in FIG. 8(e).

In the second emphasis circuit, since the video signal is easy to be influenced by noise on the higher band range that has a small level of video signal, the signal on the higher band range is boosted more in recording than that on the lower frequency band, and to raise the S/N ratio of the video signal, a white clip level is emphasized upto 150% of the signal as shown in FIG. 8(f). This emphasized signal is shifted by $\frac{1}{2}$ fH for excluding the crosstalk between the adjacent tracks and then modulated to provide FM signal in the FM circuit 25, as shown in FIG. 8(g). The output of the FM circuit 25 is passed to the luminance signal band Y and its carrier frequency deviation amounts to 1 MHz, and the resolution can be compensated in its sideband.

Figure 9:
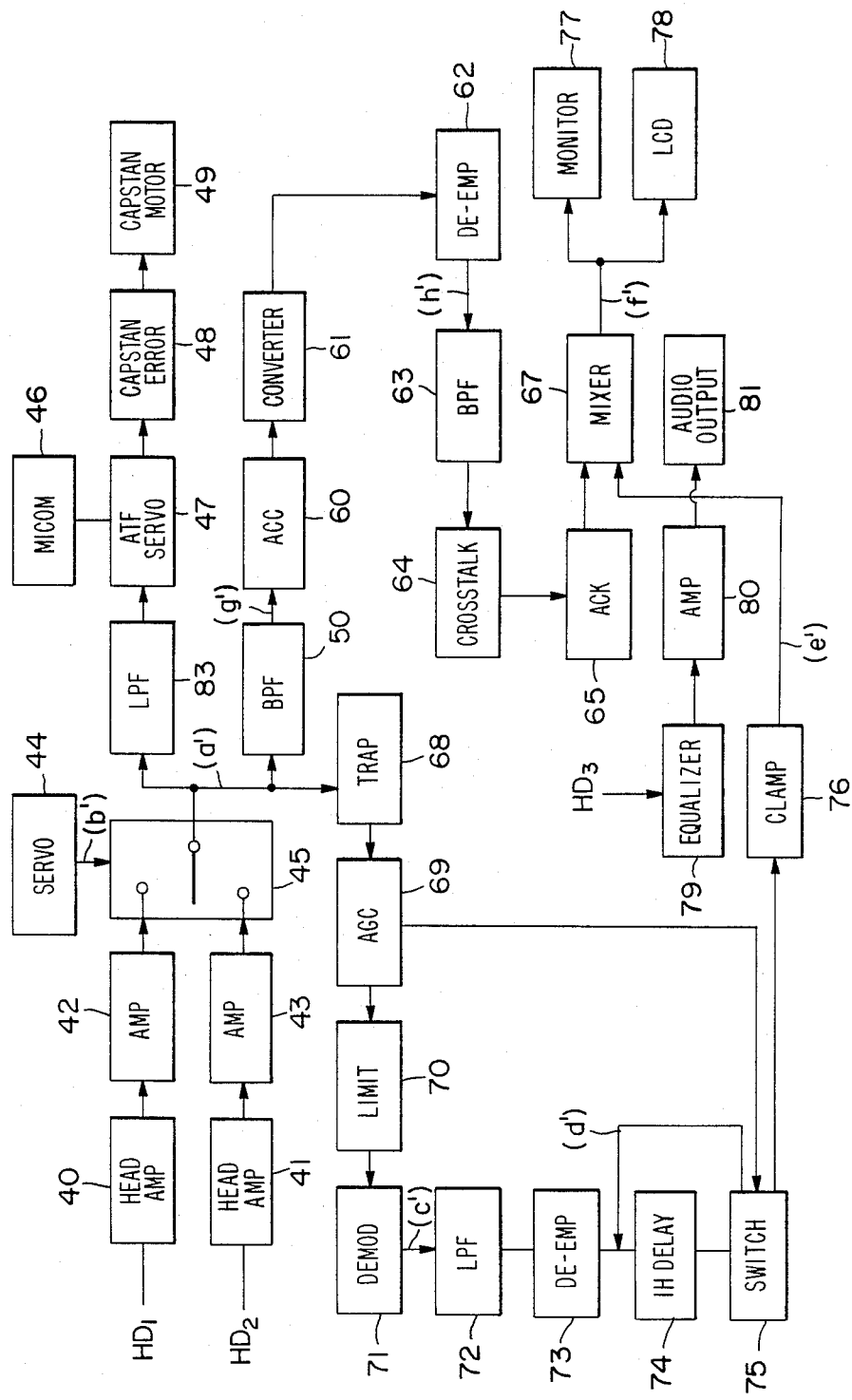
FIG. 9 shows a block diagram of the portion for reproducing the signals in a VTR system according to the invention.

FIG. 9 is a block diagram for reproducing the signals from the tape in accordance with the invention. First and second head amplifiers 40 and 41 respectively amplify the signals picked-up out of the video tape via the head HD1 and HD2 to about 43 dB level. Third and fourth amplifiers 42 and 43 are respectively used to again amplify the outputs of the first and second head amplifiers 40 and 41 to 10 dB. From a servo circuit 44, a specified signal having a frequency of 30 HZ is generated out in response to the drum revolution. A channel selector 45 selects each channel on the tape by being alternately switched in accordance with the output signal of the servo circuit 44. A low pass filter 83 passes the lower band of the control ATF pilot signal in the video signal picked-up in response to the selection of the channel selector 45. The ATF pilot signal of the low pass filter 83 is provided to a ATF servo circuit 47 for making four ATF pilot signals according to the logic output of a microcomputer 46. Corresponding to the phase difference of the output of the ATF servo circuit 47, a capstan error signal is outputed from a capstan error signal generator 48. This capstan error signal, the output of the capstan error signal generator 48 controls a capstan motor 49, by which the traveling speed of tape is controlled. Through a first band pass filter 50, the color signal component of 743 KHz is passed to a second ACC circuit 60 which is used to maintain the output of the 1st band pass filter to a constant level. The output of 743 KHz by the 2nd ACC circuit 60 is converted to 3.58 MHz via a first converter 61.

On the contrary of the recording operation, a first de-emphasis circuit 62 is used to restore the color signal to the original signal not boosted to a higher band. Of the output of the 1st de-emphasis circuit 62, only the color signal of 3.58 MHz is passed by a second band pass filter 63. A crosstalk removing circuit 64 gets rid of the crosstalk component out of the output of the 2nd band pass filter 63 to raise the S/N ratio of the color signal. The output of the crosstalk removing circuit 64 is delivered to an acknowledgement circuit 65 to be discriminated between the color signal and the black/white signal. A trap circuit 68 removes the color signal component of the video signal from the channel selector 45 but the luminance signal is fed to a RF AGC circuit 69 by which the signal gain is maintained in a constant level. The output of the RF AGC 69 is limited in a limiter 70 to be kept in a constant level and then, via a demodulator 71, is demodulated to the original signal. A low pass filter 72 removes noises resulting from the modulation to the FM signal and its output is delivered to a second de-emphasis circuit 73 to be restored to the original signal. When a drop-out signal occurs in the RF AGC circuit 69 depending upon the condition of tape, it is compensated for with a 1H delay circuit 74 which removes a line noise. The drop-out signal switches on/-off a switching circuit 75 coupled to the 1H delay circuit 74. The compensated output through the switching circuit 75 is clamped in a fixed level by a clamping circuit 76, and the output luminance signal of the clamping circuit 76 is mixed with the output color signal of the acknowledgement circuit 65 in a third mixer circuit 67. The mixed output of the video signal is displayed out through monitor 77 or a liquid crystal displaying device.

The audio signal picked-up through the audio head HD3 from the audio signal area D" on the tape is provided to an equalizer 79 to compensate characteristics caused in frequency conversion of the signal due to a transmission line and so on. The output of the equalizer 79 is amplified in an amplifier 80 and then delivered to an audio output device 82.

FIG. 10 ($a'$) to ($h'$) are waveform diagrams showing aspects of operation in FIG. 9 according to the invention, wherein:

FIG. 10($a'$) is an output waveform of the channel selector 45,

FIG. 10($b'$) is an 30-Hz output waveform of the servo circuit 44,

FIG. 10($c'$) is an output waveform of the demodulator 71,

FIG. 10($d'$) is an output waveform of the 2nd de-emphasis circuit 73,

FIG. 10($e'$) is an output waveform of the clamping circuit 76,

FIG. 10($f'$) is an output waveform of the mixer circuit 67,

FIG. 10($g'$) is an output waveform of the 1st BPF 50, and

FIG. 10($h'$) is an output waveform of the 1st de-emphasis circuit 62.

Now, A more detailed description will be made hereinafter for the reproducing operation in the VTR, with reference to the drawings, in particular to FIG. 9 and FIG. 10. The video signals picked-up out of the tape via the heads HD1 and HD2 are respectively amplified in the 1st and 2nd head amplifiers 40, 41 to 43 dB and secondly amplified in the 3rd and 4th amplifiers 42, 43 to 10 dB. These signals are entered to the channel selector 45 and alternately delivered for each channel of channel 1 and channel 2 which is alternately selected by the 30-Hz output of the drum servo circuit 44, as shown in FIG. 10($b'$). By these switching in the channel selector 45, the video output is made as illustrated in FIG. 10($a'$) Once the LPF 83 passes only the frequency of ATF pilot signal shown in FIG. 3$b$, the ATF servo circuit selectively compares the ATF pilot signals f1=102.5 KHz, f2=118.9 KHz, f3=165.2 KHz and f4=148.6 KHz to each other in response to the logic output of the microcomputer 46. After that comparison, the ATF error signal is generated according to comparing of the frequency level of 16 KHz in the adjacent track f2 and f1, and 46 KHz in f1 and f4. Depending upon the ATF error signal, the capstan error signal generator 48 controls the revolution speed of the capstan motor 49 to control the traveling speed of the tape and correctly scan the tracks. Through the 1st BPF 50, the color signal COL of 743 KHz as shown in FIG. 3$b$ is passed to become the waveform of FIG. 10($g'$), but the peak value of the sideband emphasized in recording operation is still not disappeared. The output of the 1st BPF 50 is controlled in a fixed level by the 2nd ACC 60 and then delivered to the 1st converter 61 from which the reproduced color signal of 3.58 MHz is provided out by using the phase-locked signals of 4.32 MHz and 743 KHz. For taking the original state of signal, the peak value is removed in the 1st de-emphasis circuit 62 which provides the waveform in FIG. 10($h'$). After the output of the de-emphasis circuit 62 is stabilized in passing only the color component in the 2nd BPF 63 and then it crosstalk is removed by the crosstalk removing circuit 64, it is delivered to the 3rd mixer circuit 67 through the acknowledgement circuit 65 to identify between the color signal and the black/white signal. In case of the black/white signal, a color noise component leaked is removed. The color signal of the video signal via the channel selector 45 is trapped in the trap circuit 68, but the luminance signal is made to a constant and even level through the RF AGC circuit 69 and the limiter 70, and is demodulated in the FM demodulator 71, from which the waveform of FIG. 10($c'$) is delivered. Because the unwanted noise is generated out during the modulation procedure, it is passed through the LPF 72 to exclude the noise. The original state of signal, as shown in the FIG. 10($d'$), is made after being processed in the de-emphasis circuit 73. In the 1H-delay circuit 74, the line noise is removed, and the input signal is delayed in 1H time in case that the signal drop-out occurs according to the physical condition of tape from the RF AGC circuit 69. The 1H-delay of signal is controlled by the switching circuit 75 and the clamp circuit 76 clamps the signal to a constant level, which is shown in the FIG. 10($e'$). This luminance output signal of the clamp circuit 76 is mixed with the color signal of the identifying circuit 65 in the mixer circuit 67, shown in the waveform of FIG. 10($f'$), and finally the combined video signal output is displayed on the monitor or the LCD device 78 as requested. On the other hand, the audio signal picked-up through the audio head HD3 is compensated in the frequency characteristic in the equalizer 79 and then again amplified in the amplifier 80. As a result, it is delivered to the audio output device 82 such as a speaker or a monitor device.

As will be understood from the foregoing description, the invention provides a tape format for use in the 4-mm wide video tape which enables achievement of the greatest size-reduction in a VTR apparatus with improvement of resolution in the picture reproduction by raising the S/N ration of video signal up to the maximum level because a maximum amount of area for the video signal is allocated in the tape, by recording ATF signals, color signals and luminance signals on its video area, and audio signals on its option track area, and by taking the first and second guide area in the minimum width of tape. Further, the compatibility and the unification of specifications in the manufacture of VTR's can be established using the tape format of the invention because all of the recording and reproducing operations are done in accordance with the standard frequency distribution of the video and audio signal and the ATF signal.

It is recognized that numerous changes in the described embodiment will be apparent to those skilled in the art without departing from the invention. This invention is to be limited only as defined in the claims.

What we claim is:

1. A tape format of 4-mm wide video tape for use in a VTR system adopting helical scanning and azimuth recording methods, said tape formal comprising:

a first guide area forming an uppermost part of said tape to get a first minimum portion of said tape to be in touch with an upper drum of a VTR system for preventing pictorial image outputs from swinging, audio outputs from trembling and a video head from wearing out which results from the movement of said video head protruding out of an outer surface of said drum in conjunction with the revolution of said drum;

an option track area defining a lowermost part of said tape so as to have a second minimum portion of said tape for preventing said pictorial image outputs from swinging due to trembling motion of said tape during revolution of said drum and enabling audio signals to be recorded on said tape, said option track area having a width determined on the basis of a minimum gap of a tape lead line in said drum and a minimum gap between an upper half and lower half of said drum;

a second guide area in a next part of said tape adjoining said option track area in said tape so as to have a third minimum portion of said tape for separating said audio signals in said option track area from video signals in an adjacent track;

a first overlap area next adjoining said first guide area in said tape for providing a first tape spacing which enables said video signals in an upper end portion of each field on a video track to be overlappingly recorded on the video track;

a second overlap area next adjoining said second guide area in said tape for providing a second tape spacing which enables said video signals in a lower end portion of each field on said video track to be overlappingly recorded on the video track; and a video width area between and adjoining said first overlap area and second overlap area for recording automatic track finding signals, luminance signals and color signals in a maximum frequency band;

said first and second overlap guide area, option track area, first and second overlap areas, and video width area having an aggregated width of about four millimeters.

2. A tape format as set forth in claim 1 wherein said first guide area has a tape width of $0.3 \pm 0.1$ mm forming the uppermost part of said tape, said option track area has a tape width of $0.5 \pm 0.2$ mm forming the lowermost part of said tape, said second guide area has a tape width of $0.1 \pm 0.01$ mm next to said option track area and said video width area has a tape width of $2.9 \pm 0.3$ mm.

3. The tape format of claim 1, wherein said first overlap area, second overlap area and video width area together provide a full video width of approximately 2.9 millimeters.

4. The tape format of claim 3, wherein:

said full video width is divided into a plurality of fields extending obliquely across the tape, each of said fields being divided into a plurality of signals; and said full audio width has a width extending across a gap between an upper and lower helical scanning drum and engaging both said upper and lower helical scanning drum while a video head disposed within said gap overlaps a last one of said plurality of signals in a first one of said fields.

5. The tape format of claim 4, wherein the option track area has a width approximately equal to a sum of said minimum gap of the tape lead line and said minimum gap between the upper half and lower half of the drum.

6. The tape format of claim 4, wherein said second guide area has a width determined on the basis of the value of a tolerance in assembling said drum to the VTR system and a tolerance in assembling an audio head for recording and reproducing said audio signals in said option track area.

7. The tape format of claim 4 wherein said video width area accommodates recording of video signals including automatic tracking frequency signals and color signals, with an automatic tracking frequency signal to color signal ratio of approximately minus ten decibels.

8. The tape format of claim 1 wherein said video width area accommodates recording of video signals comprising a color frequency component in a frequency band centered at 743 kilo-Hertz, automatic tracking frequency bands of 102.5 kilo-Hertz, 118.9 kilo-Hertz, 165.2 kilo-Hertz and 148.6 kilo-Hertz, and a luminance signal frequency band providing a frequency deviation of approximately one mega-Hertz.

9. The tape format of claim 3, wherein the option track area has a width approximately equal to a sum of said minimum gap of the tape lead line and said minimum gap between the upper half and lower half of the drum.

10. The tape format of claim 3 wherein said second guide area has a width determined on the basis of the value of a tolerance in assembling said drum to the VTR system and a tolerance in assembling an audio head for recording and reproducing said audio signals in said option track area.

11. The tape format of claim 3, wherein said video width area accommodates recording of video signals including automatic tracking frequency signals and color signals, with an automatic tracking frequency signal to color signal ratio of approximately minus ten decibels.

12. The tape format of claim 3 wherein said video width area accommodates recording of video signals comprising a color frequency component in a frequency band centered at 743 kilo-Hertz, automatic tracking frequency bands of 102.5 kilo-Hertz, 118.9 kilo-Hertz, 165.2 kilo-Hertz and 148.6 kilo-Hertz, and a luminance signal frequency band providing a frequency deviation of approximately one mega-Hertz.

13. The tape format of claim 1, wherein the option track area has a width approximately equal to a sum of said minimum gap of the tape lead line and said minimum gap between the upper half and lower half of the drum.

14. The tape format of claim 13, wherein said second guide area has a width determined on the basis of the value of a tolerance in assembling said drum to the VTR system and a tolerance in assembling an audio head for recording and reproducing said audio signals in said option track area.

15. The tape format of claim 13, wherein said video width area accommodates recording of video signals including automatic tracking frequency signals and color signals, with an automatic tracking frequency signal to color signal ratio of approximately minus ten decibels.

16. The tape format of claim 13, wherein said video width area accommodates recording of video signals comprising a color frequency component in a frequency band centered at 743 kilo-Hertz, automatic tracking frequency bands of 102.5 kilo-Hertz, 118.9 kilo-Hertz, 165.2 kilo-Hertz and 148.6 kilo-Hertz, and a luminance signal frequency band providing a frequency deviation of approximately one mega-Hertz.

17. The tape format of claim 1, wherein said second guide area has a width determined on the basis of the value of a tolerance in assembling said drum to the VTR system and a tolerance in assembling an audio head for recording and reproducing said audio signals in said option track area.

18. The tape format of claim 17, wherein said video width area accommodates recording of video signals including automatic tracking frequency signals and color signals, with an automatic tracking frequency signal to color signal ratio of approximately minus ten decibels.

19. The tape format of claim 1, wherein said video width area accommodates recording of video signals including automatic tracking frequency signals and color signals, with an automatic tracking frequency signal to color signal ratio of approximately minus ten decibels.

20. The tape format of claim 19, wherein said color frequency signal exhibits a frequency band centered at 743 kilo-Hertz, said automatic tracking frequency signal includes tracking frequency bands of 102.5 kilo-Hertz, 118.9 kilo-Hertz, 165.2 kilo-Hertz and 148.6 kilo-Hertz, and said luminance signal exhibits a frequency band exhibiting a frequency deviation of approximately one mega-Hertz.

21. The tape format of claim 1, wherein said video width area accommodates recording of video signals comprising a color frequency component in a frequency band centered at 743 kilo-Hertz, automatic tracking frequency bands of 102.5 kilo-Hertz, 118.9 kilo-Hertz, 165.2 kilo-Hertz and 148.6 kilo-Hertz, and a luminance signal frequency band providing a frequency deviation of approximately one mega-Hertz.

22. In a video tape recorder system having an automatic track finding signal generator which provides control signals to control the tape traveling speed, audio/video signal recording means for enabling luminance signals and color signals separated from video signals, control signals and audio signals to be recorded in said tape, and audio/video signal reproducing means enabling said luminance signals, color signals, control signals and audio signals to be reproduced out of said tape, said video tape recorder system comprising:

first means for, during recording, generating four pilot signals in said automatic track finding signal generator, mixing said pilot signals in a first mixer and again mixing outputs of said first mixer including said pilot signals with said luminance signals in a second mixer, and during reproduction, separating said video signals including said pilot signals into two channels in accordance with alternate switching in a channel selector, passing each of said video signals through a low pass filter and generating a capstan error signal in response to outputs of an automatic track finding servo circuit on the basis of logic outputs from a microcomputer to control the speed of a capstan motor;

second means for, during recording, separating said color signals from said video signals in a luminance/color separator, converting said video signals to converted signals in a lower band through an automatic color control circuit, an emphasis circuit and a lower band converter, thereby enabling mixing in said first mixer of said converted signals with automatic track finding signals provided on the basis of said pilot signals provided by said automatic track finding signal generator, and enabling said mixing of said outputs of said first mixer including said color signals with said luminance signals in said second mixer, and, during reproduction, filtering only said color signals from said channel selector through a band pass filter, maintaining the output of said band pass filter at a constant level signal and converting said constant level signal to a high frequency band of color signals, and mixing said higher frequency band color signals with resultant luminance signals in a third mixer in accordance with one of an acknowledgement of color and black/white status;

third means for, during recording, raising a signal-to-noise ratio of said luminance signals separated from said video signals in the luminance/color separator, frequency modulating said luminance signals and thereby enabling mixing of said luminance signals with said color signals and said automatic track finding signals in said second mixer, and, during reproduction, selecting out only said luminance signals through a trap circuit and said channel selector, maintaining signal gain of said luminance signals at a substantially constant level, demodulating said luminance signals, removing noise resulting from modulating of said luminance signal, reducing the signal-to-noise ratio of said luminance signals, compensating said luminance signals to provide resultant luminance signals, and thereby enabling said mixing of said resultant luminance signals with said color signals in said third mixer; and fourth means for, during recording, maintaining the audio signals at a constant level, amplifying said audio signals and modulating said audio signals for recordation, and during reproduction, subjecting the audio signal to equalization to improve characteristics of said audio signals and amplifying said audio signal to provide an audio output.

23. The video tape recorder system of claim 22, further comprising:

a video drum including an upper drum spaced apart by a first minimum gap from a lower drum, said video drum exhibiting a diameter of approximately thirty millimeters; and video head means disposed between said upper drum and lower drum, to protrude beyond exterior surfaces of said video drum, for recording and reproducing said video signals by helically scanning a full video width of approximately 2.9 millimeters in said tape.

24. The video tape recorder system of claim 23, wherein said video drum provides a lead line over which said tape travels, said lead line exhibiting a second mininum gap, and the sum of said first and second minimum gaps being approximately equal to a width of an option track on said tape for receiving said audio signals.

25. The video tape recorder system of claim 23, wherein said emphasis circuit of said second means provides a signal-to-noise ratio of about minus ten decibels between said automatic track finding signals and color signals.

26. The video tape recorder system of claim 22, further comprising:
a video drum including an upper drum spaced apart by a first mininum gap from a lower drum, said video drum exhibiting a diameter of approximately thirty millimeters and a lead line over which said tape travels, said lead line exhibiting a second minimum gap, the sum of said first and second minimum gaps being approximately equal to a width of an option track on the tape for receiving said audio signal;
video head means disposed between said upper drum and lower drum, to protrude beyond said exterior surfaces of said video drum, for recording and reproducing said video signals by helically scanning a full video width of approximately 2.9 millimeters in said tape while both said upper drum and said lower drum engage said tape.

27. The video tape recorder system of claim 22, wherein said emphasis circuit of said second means provides a signal-to-noise ratio of about minus ten decibels between said automatic track finding signals and color signals.

28. The video tape recorder system of claim 27, wherein said second means delivers said converted signals in said lower band at a center frequency of about 743 kilo-Hertz.

29. The video tape recorder system of claim 28, wherein said third means delivers said luminance signals as frequency modulated signals to said second mixer in a frequency modulated band exhibiting frequency deviation of approximately one mega-Hertz.

30. The video tape recorder system of claim 22, wherein said second means delivers said converter signals in said lower band at a center frequency of about 743 kilo-Hertz.

31. The video tape recorder system of claim 22, wherein said third means delivers said luminance signals as frequency modulated signals to said second mixer in a frequency modulated band exhibiting frequency deviation of approximately one mega-Hertz.

* * * * *